(No Model.)
W. J. MORRISON.
PROCESS OF MANUFACTURING LARD.
No. 278,166. Patented May 22, 1883.
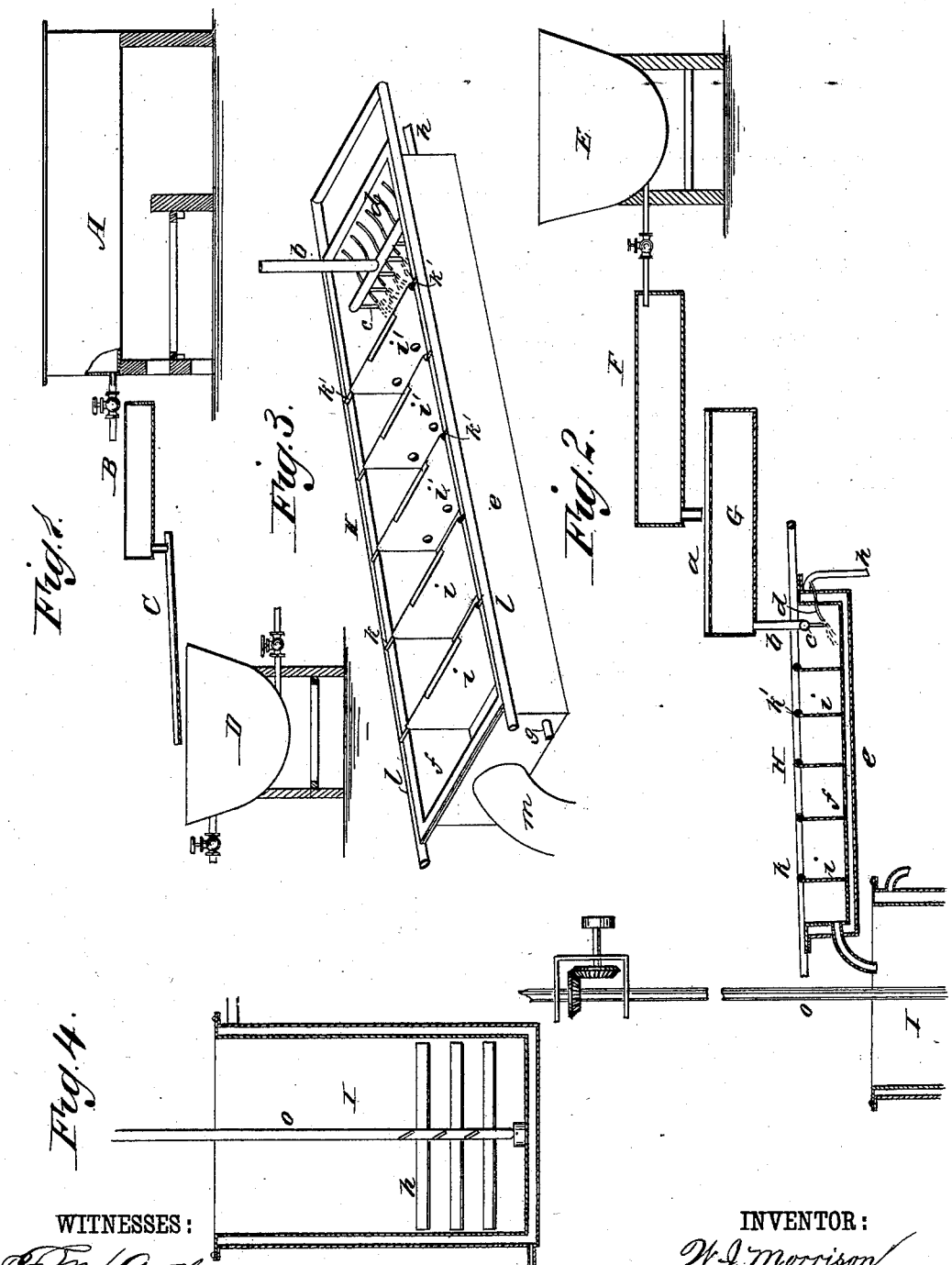
WITNESSES:
INVENTOR:
W. J. Morrison
BY
ATTORNEYS.

UNITED STATES PATENT OFFICE.

WILLIAM J. MORRISON, OF NASHVILLE, TENNESSEE.

PROCESS OF MANUFACTURING LARD.

SPECIFICATION forming part of Letters Patent No. 278,166, dated May 22, 1883.

Application filed November 6, 1882. (No model.)

*To all whom it may concern:*

Be it known that I, WILLIAM JAMES MORRISON, of Nashville, in the county of Davidson and State of Tennessee, have invented a new and Improved Process of Manufacturing Lard, of which the following is a full, clear, and exact description.

The object of my invention is the manufacture of lard by a mixture of cotton-seed oil and beef tallow or fat for the production of an article superior to hog-lard or to cotton-seed oil for use in culinary operations. It is well known that it is difficult to obtain a stable mixture of oil and solid fats unless the solid fats are in excess, for the reason that after a short time the two articles will separate and resume their respective places, according to their specific gravity.

In my improved process I obtain a stable mixture of oil and fats, in which the oil is largely in excess, by first heating the mixture and, while heated, atomizing and then quickly chilling the compound, while it is being constantly agitated, thereby producing a lard of smooth grain and uniform density throughout.

In this process I make use of certain apparatus shown in the accompanying drawings, and described hereinafter for the purpose of a better understanding of the process; but any suitable apparatus may be used.

In the drawings, Figure 1 is a sectional elevation of the apparatus used in the preliminary process of refining the oil. Fig. 2 is a sectional side view of the apparatus used in the main process. Fig. 3 is a perspective view of the atomizing and chilling pan. Fig. 4 is a sectional elevation of the cooling-tank.

The process is as follows: The crude cotton-seed oil is first placed in a tank or other suitable receiver, (represented at A in Fig. 1,) and heat is applied until the temperature of the oil is between 100° and 140° Fahrenheit. Agitation then commences, and to the heated oil from two and one-half to twenty per cent. of a solution of caustic soda of 20° Baumé is slowly added, and the agitation is kept up for an hour or more, according to the quantity of oil under treatment. The oil is then allowed to stand from one to fifteen days, when it is drawn off and filtered, and may be allowed to flow in thin sheets over a hot surface into a kettle, in which it is boiled until free from water.

B in Fig. 1 represents a filter, to which the oil is supplied from the tank A, and from which it passes by a spout, C, to the boiling-kettle D. The oil may then be allowed to stand in the kettle D until cool, and filtered immediately; or the heavier portions may be allowed to subside, when the clear oil on top is to be drawn off and filtered for future use. The solid fats are obtained by preference from fresh beef-suet, which is chopped into small pieces and "tried out" in the usual manner. The tallow is strained through heavy cloth or other suitable material into a kettle, and the temperature raised to between 150° and 300° Fahrenheit, when it is treated with between one-half per cent. and ten per cent. of a solution of caustic soda of 20° Baumé. The temperature is again raised for a short time, agitation being kept up from the time the caustic solution is added until the temperature is allowed to fall. It may then be allowed to remain undisturbed for from two to twenty-four hours, according to the amount that is being treated, after which the scum that rises to the top is removed, and heat again applied to the tallow until it boils, when it is again filtered or strained, and is then ready for use in connection with oil, prepared as above described, in the production of lard by the following process: In a kettle or suitable vessel a quantity of refined cotton-seed oil is placed, and to this is added from twelve and one-half to seventy-five per cent. of tallow prepared as above. The mixture is then brought to a boil or heated above the melting-point of tallow. Then the mixture is conveyed to a suitable reservoir, which may be kept warm by any desired means, and from this reservoir is passed through a filter, and allowed to flow into a reservoir that is provided with discharge openings or perforations, so that the heated mixture may flow in small jets onto the bottom of a chilling-pan, a current of air being supplied at the same time for cooling the material as it flows from the jet-pipes; or it may be allowed to flow through a tube or tubes, and be atomized by a current of air before falling on the chilling-surface, from whence, after sufficient agitation, it is scraped into a chilling or cooling tank, in which it may be agitated from one to twenty-four hours. An apparatus suitable for this process is shown in Fig. 2, in which E is the kettle or vessel in which the mixture is boiled.

F is the reservoir into which it flows from the kettle, and from which it is discharged upon a filtering-surface, $a$, above a tank, G. The tank G is provided with a discharge-pipe, $b$, that is provided with small nozzles $c$, that discharge the mixture to the chilling-pan H. $d$ is the air-pipe, which discharges air in jets at the mouth of the jet-pipe, so that the mixture is broken into small atoms, and in that condition falls upon the bottom of the pan H.

The pan H consists of an outer cast-iron box, $e$, formed with flanges on its upper edges and fitted with an interior box, $f$, of slightly smaller size, also having flanges on its upper edges, which rest upon the flanges of the outer box. The two boxes are fastened together, and the space between them is to be supplied with water forced in by a pipe at $g$ and allowed to flow out by a pipe at $h$. $i\ i$ are scrapers in the pan H, hinged to cross-bars $k\ k$, that rest upon the flanges of the pan, and $i'\ i'$ are perforated agitators, hinged to cross-bars $k'\ k'$. The cross-bars $k\ k'$ are fastened to longitudinal bars $l$, which extend along the outer edges of the pan, which, when moved endwise, give motion to the scrapers and agitators, all of which are to be locked when the machine is first put in motion. $m$ is the outlet for the material. When the compound cools upon the bottom of the pan the scrapers $i$ are to be unlocked, so that they may swing in one direction, but be rigid when moved in the other direction, so as to scrape the material toward the outlet. When the lard becomes so thick it will not pass through the perforations of the agitators $i'$ they are also to be unlocked, so that they will work in the same manner as the scrapers to carry the material to the outlet, and thus keep the bottom of the pan free from cooled lard. The chilling-pan H is lower at the outlet end, so that the compound tends to run in that direction, while the agitators keep it constantly mixed, and by the process of locking and unlocking the scrapers and agitators the bottom of the pan is kept clear, so that the atoms of oil are chilled quickly by coming in contact with the cool iron. The current of water flowing under and around the pan serves to carry off the heat and keep the pan cool. From the outlet $m$ the material flows into the cooling-tank I, which is shown as also made with double sides, between which a current of water is supplied. This tank is furnished with an agitator consisting of a shaft, $o$, provided with arms or wings $p$, fastened diagonally on the shaft, which may be set in motion to cause a continuous beating of the lard from the bottom to the top, thereby making it lighter and of finer grain, as well as causing its rapid cooling.

I do not limit myself to the apparatus shown nor to the use of water as a cooling medium; neither do I limit myself to the process of preparing the tallow and oil previous to mixture, nor to the use of any special solid fat.

Having thus fully described my invention, I claim as new and desire to secure by Letters Patent—

1. The hereinbefore-described process for the manufacture of lard from oil and fat, which consists in first heating the mixture of cotton-seed oil and beef-tallow and then discharging the heated mixture in an atomized condition upon a chilling-surface, substantially as described.

2. The hereinbefore-described process for the manufacture of lard, which consists in heating a mixture of cotton-seed oil and fat, the oil being in excess, and then atomizing the same by a current of air while it is being discharged upon the surface of a chilling-pan, substantially as described.

3. In apparatus for manufacturing lard, the combination, with a chilling-pan and a reservoir for the heated mixture, provided with jet-pipes for discharge of the same to the pan, of an atomizer, substantially as and for the purpose set forth.

WM. J. MORRISON.

Witnesses:
J. C. WHARTON,
R. T. FLEMING, Jr.